US005154092A

United States Patent [19]

MacPhee

[11] Patent Number: 5,154,092

[45] Date of Patent: Oct. 13, 1992

[54] INTERNAL WORM DRIVE AND OSCILLATING ROLLER ASSEMBLY FOR USE IN INKING SYSTEMS FOR PRINTING PRESSES

[75] Inventor: John MacPhee, Rowayton, Conn.

[73] Assignee: Baldwin Technology Corporation, Stamford, Conn.

[21] Appl. No.: 725,439

[22] Filed: Jul. 3, 1991

Related U.S. Application Data

[62] Division of Ser. No. 514,538, Apr. 26, 1990.

[51] Int. Cl.$^5$ .......... F16H 29/20; F16H 1/12

[52] U.S. Cl. .......... 74/425; 74/89.14; 74/424.6

[58] Field of Search .......... 74/425, 89.14, 89.15, 74/424.6, 422

[56] References Cited

U.S. PATENT DOCUMENTS

| | | | |
|---|---|---|---|
| 687,659 | 11/1901 | Schriver . | |
| 715,902 | 12/1902 | Thompson . | |
| 1,022,563 | 4/1912 | McKinley . | |
| 2,040,331 | 5/1936 | Peyrebrune | 101/348 |
| 3,110,253 | 11/1963 | DuBois | 101/348 |
| 3,595,094 | 7/1971 | Lemor | 74/89.14 |
| 3,623,323 | 11/1971 | Fritz et al. | 74/89.14 X |
| 3,751,998 | 8/1973 | Vasilatos | 74/89.15 |
| 4,040,682 | 8/1977 | Poulsen | 308/176 |
| 4,187,933 | 2/1980 | Calabrese et al. | 74/89.14 X |
| 34,397,236 | 8/1983 | Greiner et al. | 101/350 |
| 4,428,290 | 1/1984 | Junghans et al. | 101/348 |
| 4,509,426 | 4/1985 | Hardin | 101/348 |
| 4,672,894 | 6/1987 | Hardin | 101/348 |
| 4,697,476 | 10/1987 | Maxwell | 74/785 |
| 4,722,238 | 2/1989 | Navarro | 74/422 |
| 4,730,503 | 3/1988 | Rosenthal | 74/89.15 X |
| 4,741,220 | 5/1988 | Watanabe et al. | 74/424.6 |
| 4,765,651 | 8/1988 | Unger | 74/89.14 X |
| 4,811,617 | 3/1989 | Whiteman, Jr. | 74/422 |
| 4,833,987 | 5/1989 | Hardin | 101/348 |
| 4,887,533 | 12/1989 | Lemaster et al. | 101/492 |

*Primary Examiner*—Leslie A. Braun
*Assistant Examiner*—Juli Kroukowski
*Attorney, Agent, or Firm*—Morgan & Finnegan

[57] ABSTRACT

An internal worm drive has a worm gear and a substantially hollow tubular worm with an outer surface and an inner surface. The inner surface has at least one internal worm thread mating the worm gear. The axis of the worm gear is substantially perpendicular to the longitudinal axis of the tubular worm. Utilizing the tubular worm with the threaded internal surface in conjunction with the mating worm gear is an oscillating roller assembly suitable for use as an ink roller in lithographic presses. The oscillating roller assembly has a shaft, and a bearing unit mounted along the shaft. The worm gear having a plurality of teeth is contained in a slotted space in the bearing unit and the shaft such that the rotational axis of the worm gear is substantially perpendicular to the longitudinal axis of the bearing unit and the shaft. The slotted space has first and second opposite longitudinal ends within the shaft. A pair of substantially coaxial eccentric cams are integrally affixed to opposite surfaces of the worm gear. The cams alternately engage the shaft at the opposite ends of the slotted space. A roller shell having at least one internal thread is circumferentially mounted around the bearing unit such that its internal thread engages the teeth of the worm gear. Rotation of the roller shell causes the worm gear to rotate, thereby causing the cams to alternately engage the shaft at the opposite ends of the slotted space, thereby causing the bearing unit and roller shell to oscillate back and forth along the shaft.

9 Claims, 2 Drawing Sheets

INTERNAL WORM DRIVE AND OSCILLATING ROLLER ASSEMBLY FOR USE IN INKING SYSTEMS FOR PRINTING PRESSES

This is a divisional of co-pending application Ser. No. 07/514,538 filed Apr. 26, 1990.

FIELD OF THE INVENTION

The present invention relates to a novel internal worm drive and also to an oscillating roller assembly for use in inking systems in printing presses.

BACKGROUND OF THE INVENTION

Inking systems for lithographic and other types of printing presses require that some of the rollers be oscillated in the axial direction to eliminate ridging and to minimize ghosting. To accomplish this, many press designers utilize external worm drives which are well known in the art and date back to the Middle Ages. Such drives are an integral part of the press, are installed during manufacture, and have proven to be rugged and reliable.

In order to further improve print quality, additional oscillating rollers are sometimes incorporated into a press after it has been installed and operated for some time. Due to space limitations it is generally necessary for such rollers to have self-contained mechanisms for generating the oscillatory motion. However, also because of space limitations, no satisfactory arrangement has been found which, to date, utilizes the proven worm drive concept in add-on rollers which have a self-contained mechanism.

Generally, the self-contained mechanisms for generating characterized further according to the three types of cam surfaces employed: continuous single revolution barrel, continuous duplex or cross threaded, and dual discontinuous cam surfaces of opposite lead.

The most straightforward mechanism is the single barrel type where a barrel cam is mounted on the inside of the rotating roller and one or more followers are secured to the non-rotating roller shaft. Alternately, the cam can be mounted on the shaft and the follower(s) on the roller.

In the known devices, exemplified by U.S. Pat. No. 3,110,253, one cycle of axial oscillatory motion is generated for each revolution of the roller. However, at high press speeds the rapid oscillatory motion produced by this design can cause unwanted streaks in the printed product.

To correct this problem some designs have utilized gears internally and externally to reduce the relative rotational speed of cam and follower, thereby slowing down the axial oscillatory motion. U.S. Pat. No. 2,040,331 is an example of such a device where the gears are located inside the roller. U.S. Pat. No. 4,397,236, on the other hand, is an example of where the gears are located external to the roller.

The second type of device also uses a continuous cam having a multi-rotational surface. Such a cam is known as a duplex or cross-threaded cam and is exemplified by the cams disclosed in U.S. Pat. Nos. 715,902 and 4,040,682. In these designs, several revolutions of the roller are required to produce one cycle of oscillatory motion. One problem encountered with this type of prior art device is that the mechanism is prone to jam as a result of wear.

In the third type of mechanism, disclosed for example in U.S. Pat. Nos. 1,022,563 and 4,833,987, two discontinuous cam surfaces of opposite lead are employed. Oscillatory motion is provided by using two cam followers each of which alternately engages and disengages one of the cam surfaces. One problem encountered with these designs is excessive wear at high press speeds and resultant malfunctioning.

Thus, prior known internal mechanical devices have experienced problems such as mechanical wear for one reason or another. One reason for mechanical wear is that the force needed to produce the axial motion is generated at the contact point between the cam and follower. Wear can result at this point. In those designs which do not utilize gears, the relative speed of the follower is very high relative to the cam. In those designs which employ internal gears, the gears must be small enough to fit inside the roller. As a result, the gears must travel at relatively high speeds which may result in excessive wear after extended use.

Therefore, a significant problem encountered with all prior art self-contained designs for use in inking systems is poor reliability resulting from excessive mechanical wear, especially at high press speeds. Another problem with many prior art devices is that they are not compact enough to be used in certain locations in the press. A third problem with some prior art designs is that the oscillatory motion produced is not pure harmonic, i.e. is not sinusoidal.

Therefore, there presently exists a need for a self-driven oscillating roller which utilizes a worm drive mechanism compact enough to fit inside such a roller, and thus significantly reduces or avoids the aforementioned problems associated with the devices currently utilized in the art.

OBJECTS OF THE INVENTION

It is therefore an object of the present invention to provide a worm drive utilizing an internal worm in conjunction with a mating worm gear which is particularly adapted for inking systems in lithographic presses.

Another object of the present invention is to provide a self-contained roller drive mechanism which generates a pure harmonic motion in the axial direction.

It is a further object of the invention to provide an oscillating ink roller assembly which utilizes the internal worm drive above.

It is also an object to provide an oscillating ink roller assembly which is both rugged and reliable.

Another object is to provide an oscillating ink roller assembly which is compact.

A further object is to provide an oscillating ink-roller assembly which can be manufactured at low cost.

Additional objects and advantages of the invention will be set forth in the description which follows and, in part, will be obvious from the description and the advantages being realized and attained by means of the instrumentalities, parts, apparatus and systems, steps and procedures pointed out in the appended claims.

SUMMARY OF THE INVENTION

These and other objects of the invention are achieved by providing an internal worm drive means includes a worm gear and also a substantially hollow tubular worm having an outer surface and an inner surface. The inner surface of the tubular worm has at least one internal worm thread engaging the worm gear. The axis of rotation of the tubular worm is substantially perpendicular to the axis of rotation of the worm gear. Rotation of the tubular worm about its axis causes the worm gear mated with the internal worm threads of the inner surface of the tubular worm to rotate about its axis.

Also provided as part of the invention is an oscillating roller assembly suitable for use as an ink roller, which utilizes the internal worm drive described above. The oscillating roller assembly has a shaft and a bearing unit mounted along the shaft. The shaft and the bearing unit are substantially coaxial. A worm gear having a plurality of teeth is disposed in a slotted space in the bearing unit and the shaft such that the rotational axis of the worm gear is substantially perpendicular to the longitudinal axis of the shaft and the longitudinal axis of the bearing unit. The slotted space containing the worm gear has first and second opposite longitudinal ends in the shaft. A pair of substantially coaxial eccentric cams are integrally affixed to opposite surfaces of the worm gear. A roller shell having at least one internal thread is circumferentially mounted around the bearing unit such that the internal thread of the roller shell engages the teeth of the worm gear. Rotation of the roller shell about its longitudinal axis causes the worm gear to rotate about its axis, thereby causing the cams affixed thereto to alternately contact the opposite longitudinal ends of the slotted space in the shaft. As the cams alternately contact the opposite ends of the space in the shaft, the bearing unit oscillates back and forth along the shaft. As the bearing unit oscillates, it also causes the roller shell to oscillate back and forth along the shaft in substantial unison with the bearing unit.

DETAILED DESCRIPTION OF THE PREFERRED EMBODIMENTS

Figure 1:
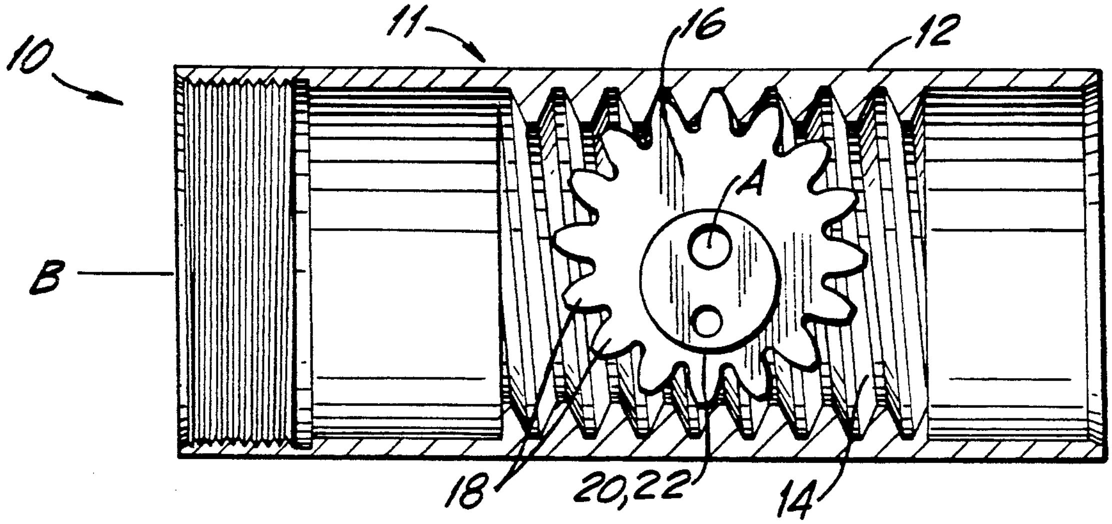
FIG. 1 is an exposed side view of an internal worm drive according to one embodiment of the present invention.

Referring now to the drawings in which like numerals indicate like components, FIG. 1 is a cross-sectional cut-away view of an internal worm drive means 10 according to one embodiment of the present invention. The internal worm drive means includes a tubular worm 11. The tubular worm is manufactured from any substantially rigid and durable material known in the art. Preferably, the tubular worm 11 is made of metal or metal alloy; most preferably, steel. The outer diameter of the tubular worm can vary according to the uses for which it will be put. The tubular worm 11 has an outer surface 12 and an inner surface 14. The inner surface of the tubular worm is threaded in either a right- or left-handed manner. It is preferred that the active surface of the inner threaded surface 14 have an active surface finish of not greater than about 24 microinches. While the inner surface 14 of the tubular worm 11 is shown in FIG. 1 with a single thread, it is also within the scope of the invention that the inner surface have a double threaded worm.

Also shown in FIG. 1 is a worm gear 16 which is provided as part of the internal worm drive means 10. The worm gear 16 has a plurality of teeth 18. Each tooth of the worm gear will engage the threads on the inner surface 14 of the tubular worm 11. As the tubular worm 11 rotates about its longitudinal axis "B", its thread on the inner surface 14 will engage each tooth 18 of the worm gear 16, thereby causing the worm gear to rotate about its transverse axis through its center "A". The axis of rotation of the worm gear is substantially perpendicular to the longitudinal axis of rotation of the tubular worm of the internal worm drive. Like the tubular worm 11, the worm gear 16 is also preferably made from a durable alloy such as, for example, case hardened steel. It is especially desirable that the active surface of the worm gear teeth 18 have a surface active finish of not greater than about 32 microinches.

The worm gear 16 may additionally have eccentric cams 20, 22 integrally affixed to its opposite surfaces. FIG. 1 shows one of the cams. The second cam would be mounted to the worm gear on the opposite side. The two cams would preferably be substantially coaxial. The cams 20, 22 attached to the worm gear 16 will drive additional components hereinafter to be described.

Figure 3:
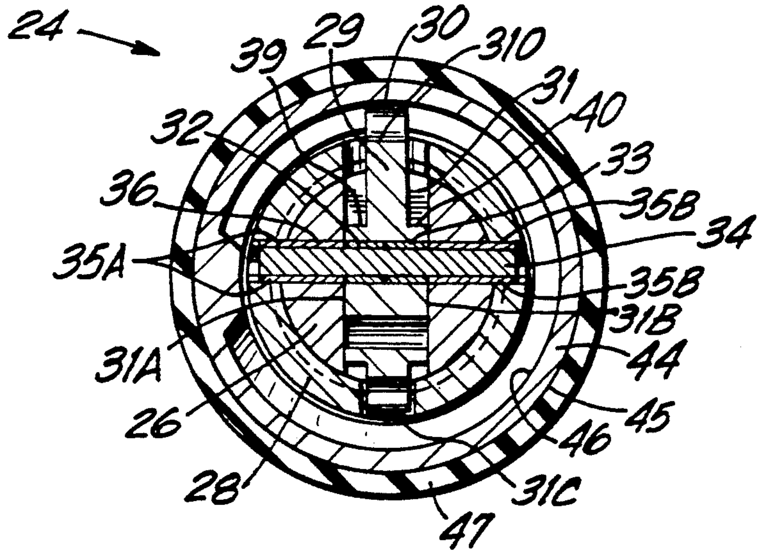
FIG. 3 is a cross-sectional view of the oscillating roller assembly shown in FIG. 2 taken through line 2′—2′.
Figure 2:
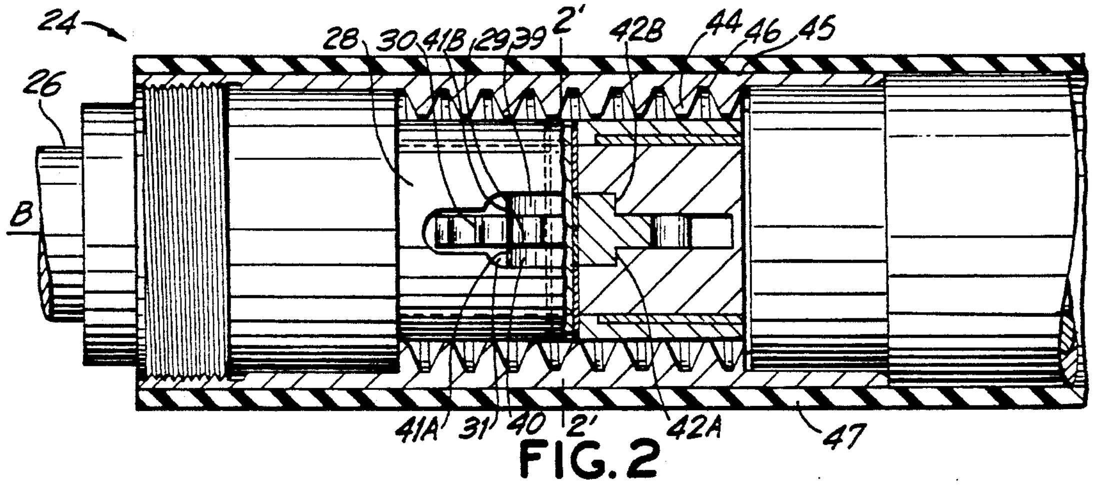
FIG. 2 is an exposed top view of an oscillating roller assembly according to one embodiment of the present invention.

Referring now to FIGS. 2 through 4, there is shown an oscillating roller assembly 24. As that term is used herein, the work "oscillating" refers to reciprocating motion along an axis, for example the axis "B". The oscillating roller assembly 24 utilizes the aforementioned novel internal worm drive concept typified by the tubular worm 11 in conjunction with the internal worm gear 16/dual eccentric cam 20, 22 combination shown in FIG. 1. A substantially circular shaft 26 is provided for mounting a bearing unit 28. The shaft is preferably a "dead" shaft, with no rotational, lateral or longitudinal motion. The opposite ends of the shaft can be mounted to another structure (not shown). The bearing unit 28 is disposed along the shaft. The bearing unit is also substantially circular and substantially coaxial with the shaft. The shaft may have an optional axial oil hole for filling and recirculation of oil.

Housed within the bearing unit 28 and shaft 26 is a worm gear 29 having the plurality of teeth 30. Worm gear 29 and teeth 30 correspond to the worm gear 16 and teeth 18 shown in FIG. 1. The worm gear is mounted and contained in slotted space 31 cut or machined, for example, out of the bearing unit 28 and shaft 26. Points 31A and 31B in FIG. 3 represent the transverse boundaries of slotted space 31, while points 31C and 31D represent the upper and lower boundaries. The worm gear 29 is mounted so as that its rotational axis about the point "A" (through the center of the worm gear) is substantially perpendicular to the longitudinal axis of the shaft 26 about the point "B". Point "B" also represents the longitudinal axis of the bearing unit 28. The worm gear may have a right or left hand helix. In any event, the helix hand of the worm gear will be equal and opposite to that of the threaded inner surface of the roller shell hereinafter described. In one embodiment of the invention shown in FIGS. 2 through 4 the helix angle is about 3.14 degrees.

The worm gear 29 is preferably made from a durable metallic alloy. Manganese bronze is one material for the worm gear, but most preferably the material is a steel alloy. While the worm gear may have any number of teeth, it is desirable that the gear have about sixteen teeth. The worm gear preferably also has a tooth-to-tooth composite error of not greater than about 0.001 and a total composite error of not greater than about 0.002. It is especially preferred that the active surface of the worm gear teeth 30 have a surface active finish of not greater than about 32 microinches. Also especially preferred is the hardness of the worm gear which should preferably be in the range of about $R_c$ 55–60 ("Rockwell C").

Figure 4A:
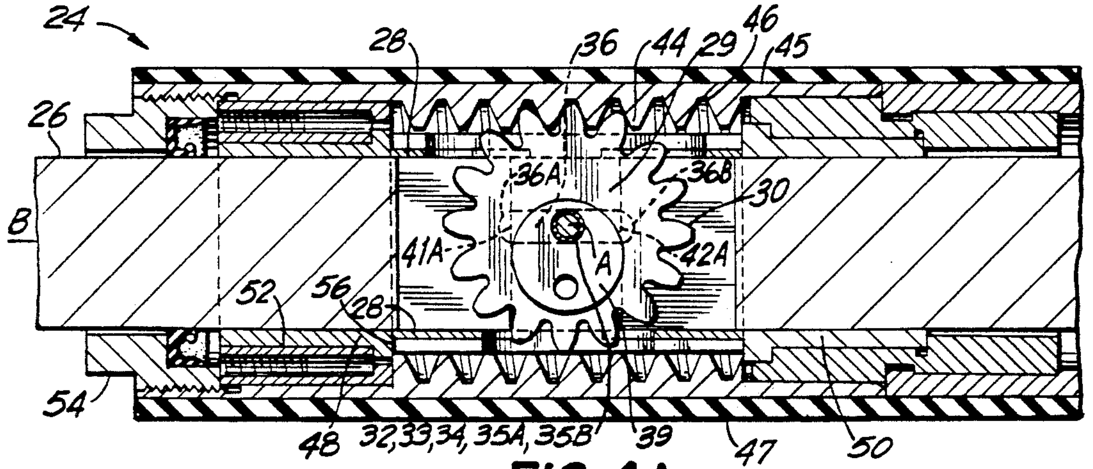
FIG. 4A is an exposed side view of the oscillating roller assembly shown in FIG. 2.
Figure 4B:
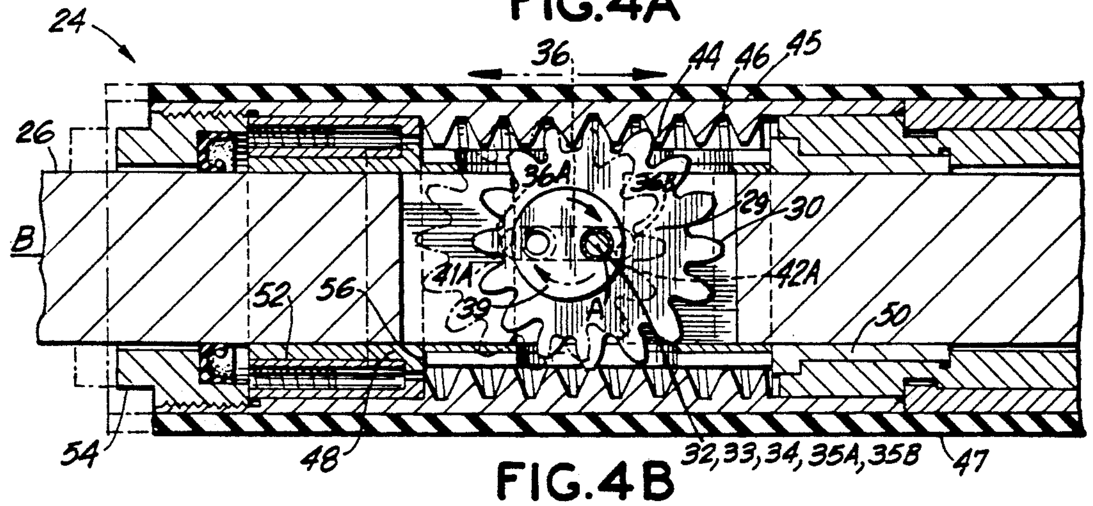
FIG. 4B is a second exposed side view of the oscillating roller assembly shown in FIG. 2.

As shown in FIG. 3, the worm gear 29 is mounted in the slotted space 31 in the bearing unit 28 and shaft 26 by a pair of needle bearings 32, 33 pressed through the central bore "A" of the worm gear 29. The worm gear needle bearing 32, 33 surround a dowel pin 34 also mounted through the shaft and bearing unit. The dowel pin 34 is further supported by a pair of standard drill bushings 35A and 35B. The drill bushings are positioned through the shaft and prevent worm gear rotation and deflection about the axis "B". The drill bushings are also pressed into the bearing unit 28 to allow the bearing unit to move axially as the dowel pin 34 moves. Other means of mounting the worm gear may occur to those skilled in the art, and are certainly within the scope of the invention. As shown in FIGS. 4A and 4B, the bushings 35A and 35B ride in a longitudinal groove 36 in the shaft. The longitudinal groove 36 has endpoints 36A and 36B. As shown in FIG. 3, the longitudinal groove extends the full transverse width of the shaft through the slotted space 31.

As shown in FIGS. 2 and 3, there are integrally affixed to the opposite surfaces of the worm gear 29 a pair of substantially coaxial eccentric cams 39 and 40. FIGS 4A and 4B shown one of the cams 39. Cams 39 and 40 correspond to the cams 20 and 22 shown in FIG. 1 Cams 39 and 40 can have substantially identical diameters within about 0.005 inches. The cams will alternately contact the shaft 26 at points 41A, 41B and 42A, 42B shown in FIG. 2. Points 41A, 41B and 42A, 42B are at longitudinal opposite ends of the slotted space 31, respectively. FIGS. 4A and 4B show points 41A and 42A. Contact points 41A and 42A are substantially coplanar, while points 41B and 42B are substantially coplanar. Endpoints 36A and 36B of longitudinal groove 36 extends slightly beyond the contact points 41A, 41B and 42A, 42B, respectively, in the longitudinal direction.

Circumferentially disposed around the bearing unit 28 and shaft 26 is a roller shell 44 which corresponds to the tubular worm 11 shown as part of the internal worm drive 10 in FIG. 1. The roller shell 44 is substantially coaxial with the bearing unit 28 and the shaft 26. The roller shell 44 is shown with an outer surface 45 and an inner surface 46. The outer surface 45 may be plated or may be covered with a covering material. If the outer surface is plated, then it should be smooth and preferably machine-ground. If the outer surface 45 is covered with an optional cover 47 made of rubber or other material, then the outer surface may be rough.

The inner surface 46 of the roller shell 44 is internally threaded. The threading of the inner surface 46 can be right-handed or left-handed, and is opposite to that of the worm gear 29. The thread of the inner surface engages the teeth 30 of the worm gear 29. As previously mentioned, it is preferred that the active surface of the inner threaded surface 46 have a surface active finish of not greater than about 24 microinches. The threaded inner surface should also preferably have a hardness in the range of about $R_c$ 62–70.

As the roller shell 44 is rotated about the longitudinal axis "B", the internal thread of the inner surface 46 of the roller shell 44 engages the teeth 30 of the worm gear 29 and thereby drives the worm gear about its axis "A". As the worm gear turns, the pair of eccentric cams 39 and 40 attached to the worm gear alternately contact points 41A, 41B and 42A, 42B, respectively, and thereby cause the bearing unit 28 to oscillate back and forth along the shaft 26 in a forward and reverse axial direction. In FIG. 2, points 41A, 41B and 42A, 42B are shown inside the space 31. FIGS. 4A and 4B show a side view of points 41A and 42A along the dotted line. Thus, the rotational motion of the worm gear 29 is translated into the reciprocating axial motion of the bearing unit 28 along the shaft 26. The reciprocating motion of the bearing unit 28 causes the roller assembly 44 to oscillate back and forth along the shaft in substantial unison with the bearing unit.

In FIG. 4A, the teeth 30 of the worm gear 29 are shown engaging the threaded inner surface 46 of the roller shell 44. The central bore "A" of the worm gear 29, occupied by the needle bearings 32, 33 and the dowel pin 34, is shown at a position in the longitudinal groove 36 approximately half way between points 36A and 36B. In FIG. 4B, eccentric cam 39 is shown contacting the shaft 26 at point 41A. Eccentric cam 40 could further contact the shaft at point 41B such that points 41B and 42B would be substantially coplanar in the transverse direction.

In FIGS. 4A and 4B, rotation of the roller shell 44 causes the teeth 30 of the worm gear 29 engaged by the threaded inner surface 46 to turn about point "A". This in turn causes the eccentric cam combination 39 and 40 to rotate about the point "A". As the cams turn about point "A", the worm gear 29 moves longitudinally along the groove 36 until it approaches end position 36B as shown in FIG. 4B. At the same time eccentric cam 39 contacts the shaft at point 41A and cam 40 contacts the shaft at point 41B, thereby causing the bearing unit to move axially along the shaft in one direction. Continued rotation of the roller shell 44 will cause the point "A" of the worm gear to move in a reverse direction from end point 36B through the center of groove 36 until point "A" approaches end position 36A. At the same time, cam 39 will contact point 42A on the shaft and cam 40 will contact point 42B, thereby causing the bearing unit to move in the opposite axial direction. Thus, as the roller shell rotates or turns, point "A" of the worm gear will move back and forth between end points 36A and 36B of groove 36. At the same time, cam 39 and 40 will alternately contact points 41A, 41B, and 42A, 42B on the shaft, respectively, thereby causing the bearing unit to oscillate along the shaft. The roller shell 44 will also oscillate in substantial unison with the bearing unit.

Those skilled in the art may find other ways of translating the rotational motion of the worm gear into the oscillating motion of the bearing unit. For example, a pair of crank arms could be pinned at one end to the shaft, while their other ends are mounted on the cams. In another embodiment, a double threaded tubular worm could be used in conjunction with a mating worm gear to impart faster oscillatory motion to the bearing unit.

Also provided as part of the invention are bearings 48 and 50 shown in FIGS. 4A and 4B. Bearing 48 is pressed into a first retainer 52. The retainer 52 has threaded holes to facilitate dissembly of the retainer. An end plug 54 constrains retainer 52 in the axial direction by pushing against a shoulder 56 in the axial direction. Bearing 50 is pressed into the roller shell 44. The bearings 48, 50 provide bearing surface support for the bearing unit 28 of the roller assembly 24. These also serve to prevent excess "play" of the bearing unit 28 in the axial direction along the shaft 26. As the bearing unit pushes against bearing 48 in the axial direction, the roller shell 44 moves to the left in the axial direction. As the bearing unit pushes against bearing 50 in the opposite axial direction, the roller shell moves to the right in the axial direction.

The oscillating roller assembly heretofore described will find quick application as an ink roller assembly for use with inking systems for printing presses, for example. The oscillating roller assembly will be especially preferred over those currently utilized in the art due to lower replacement costs resulting from less wear. Those skilled in the art may find other applications for the novel design of the worm drive mechanism which utilizes the internally threaded worm, as well as for the oscillating roller assembly.

While modifications to the foregoing invention may occur to those skilled in the art, it is to be understood that the invention is not intended to be limited to the particular embodiments described herein, but rather is intended to cover all modifications that are within the scope of the specification and accompanying claims.

What is claimed is:

1. An internal worm drive means, comprising a worm gear having an axis of rotation, and a substantially hollow tubular worm having an axis of rotation and an outer surface and an inner surface, said inner surface having at least one internal worm thread engaging said worm gear, wherein the axis of rotation of said tubular worm is substantially perpendicular to the axis of rotation of said worm gear.

2. An internal worm drive means, comprising a worm gear having an axis of rotation, and a substantially hollow tubular worm having an axis of rotation and an outer surface and an inner surface, said inner surface having at least one internal worm thread engaging said worm gear to rotate said worm gear in a linearly fixed position with respect to and upon rotation of said worm, wherein the axis of rotation of said worm is substantially perpendicular to the axis of rotation of said worm gear, said worm gear including a pair of eccentric cam members integrally affixed to opposite surfaces of said worm gear for linearly driving external components upon rotation of said worm gear.

3. The internal worm drive means as claimed in claim 2, wherein said inner surface has a double threaded worm engaging said worm gear.

4. The internal worm drive means as claimed in claim 2, wherein said worm drive is made of a steel alloy.

5. The internal worm drive means as claimed in claim 2, wherein said internal thread is left-handed.

6. The internal worm drive means as claimed in claim 2, wherein said internal thread is right-handed.

7. The internal worm drive means of claim 1, further comprising means for supporting said worm gear.

8. The internal worm drive means of claim 1, further comprising a hollow member located at least partially within said substantially hollow tubular worm, said hollow member provided with a slot, said worm gear having a central bore, a portion of said worm gear passing through said slot to engage said substantially hollow tubular worm, said hollow member provided with a pair of needle bearings pressed through said central bore of said worm gear, thereby supporting said worm gear.

9. The internal worm drive means of claim 8, wherein said hollow member is a bearing unit.

* * * * *